(12) United States Patent
Kern et al.

(10) Patent No.: US 11,465,083 B2
(45) Date of Patent: Oct. 11, 2022

(54) SERVICEABLE OIL FILTER ASSEMBLY

(71) Applicant: SOGEFI AIR & COOLING USA, INC., Rochester Hills, MI (US)

(72) Inventors: Tom Kern, Rochester Hills, MI (US); Fabien Sanet, Rochester Hills, MI (US); Francis Rolland, Rochester Hills, MI (US)

(73) Assignee: Sogefi Air & Cooling USA, Inc., Rochester Hills, MI (US)

( * ) Notice: Subject to any disclaimer, the term of this patent is extended or adjusted under 35 U.S.C. 154(b) by 268 days.

(21) Appl. No.: 16/623,693

(22) PCT Filed: Jun. 22, 2018

(86) PCT No.: PCT/US2018/038972
§ 371 (c)(1),
(2) Date: Dec. 17, 2019

(87) PCT Pub. No.: WO2018/237252
PCT Pub. Date: Dec. 27, 2018

(65) Prior Publication Data
US 2021/0138377 A1    May 13, 2021

Related U.S. Application Data

(60) Provisional application No. 62/523,909, filed on Jun. 23, 2017.

(51) Int. Cl.
*B01D 35/34* (2006.01)
*B01D 29/13* (2006.01)
*B01D 35/147* (2006.01)

(52) U.S. Cl.
CPC .............. *B01D 35/34* (2013.01); *B01D 29/13* (2013.01); *B01D 35/1475* (2013.01)

(58) Field of Classification Search
CPC ..... B01D 35/34; B01D 29/13; B01D 35/1475
See application file for complete search history.

(56) References Cited

U.S. PATENT DOCUMENTS 4,246,109 A   1/1981  Manders
4,540,489 A   9/1985  Barnard
(Continued)

FOREIGN PATENT DOCUMENTS

EP   1419809 A1   5/2004
EP   2622202 B1   9/2011
(Continued)

OTHER PUBLICATIONS

International Search Report for PCT/US2018/038972 dated Nov. 16, 2018, 2 pages.
(Continued)

*Primary Examiner* — Waqaas Ali
(74) *Attorney, Agent, or Firm* — Warner Norcross + Judd LLP

(57) ABSTRACT

An improved serviceable oil filter assembly is provided. The oil filter assembly includes a first end cap, a second end cap, a retainer element, and a cylindrical filter element. The first end cap defines a dirty oil inlet and a clean oil outlet. The second end cap includes a threaded collar for attachment to a threaded sidewall of the first endcap. The retainer element secures the cylindrical filter element within an interior volume of the oil filter assembly. The cylindrical filter element functions in combination with the retainer element to divide the interior volume of the serviceable oil filter assembly into a dirty oil chamber in fluid communication with the dirty oil inlet and a clean oil chamber in fluid communication with the clean oil outlet.

15 Claims, 4 Drawing Sheets

(56) References Cited

U.S. PATENT DOCUMENTS

| | | | |
|---|---|---|---|
| 5,695,633 A * | 12/1997 | Ernst | B01D 29/21 210/441 |
| 6,016,923 A * | 1/2000 | Baumann | B01D 29/21 210/450 |
| 6,068,763 A | 5/2000 | Goddard | |
| 6,221,242 B1 | 4/2001 | Deibel et al. | |
| 6,228,274 B1 | 5/2001 | Deibel et al. | |
| 6,235,194 B1 | 5/2001 | Jousset | |
| 6,475,379 B2 | 11/2002 | Jousset et al. | |
| 6,568,539 B1 | 5/2003 | Deibel et al. | |
| 6,610,203 B1 | 8/2003 | Jainek | |
| 6,626,787 B2 | 9/2003 | Porter | |
| 6,716,361 B2 | 4/2004 | Deibel et al. | |
| 6,814,681 B2 | 11/2004 | Porter | |
| 6,835,304 B2 | 12/2004 | Jousset et al. | |
| 6,953,411 B2 | 10/2005 | Burns et al. | |
| 7,314,555 B2 | 1/2008 | Koehler et al. | |
| 7,413,089 B1 | 8/2008 | Tidwell | |
| 7,597,202 B1 | 10/2009 | Tidwell | |
| 8,163,056 B2 | 4/2012 | Coulonvaux et al. | |
| 8,293,103 B2 | 10/2012 | Johnson et al. | |
| 8,419,934 B1 | 4/2013 | Robinson | |
| 8,444,735 B2 | 5/2013 | Coulonvaux et al. | |
| 8,474,631 B2 | 7/2013 | Kocksch | |
| 8,523,973 B2 | 9/2013 | Ackermann et al. | |
| 8,753,415 B2 | 6/2014 | Coulonvaux et al. | |
| 8,973,760 B2 | 3/2015 | Ries et al. | |
| 9,056,281 B2 | 6/2015 | Suzuki et al. | |
| 9,724,627 B2 | 8/2017 | Malgorn et al. | |
| 2003/0127402 A1 | 7/2003 | Diebel et al. | |
| 2006/0196822 A1 | 9/2006 | Koehler et al. | |
| 2009/0008320 A1 | 1/2009 | Harder et al. | |
| 2009/0321339 A1 | 12/2009 | Suzuki et al. | |
| 2012/0080372 A1 | 4/2012 | Ries et al. | |
| 2013/0043176 A1 | 2/2013 | Johnson et al. | |
| 2014/0021119 A1 | 1/2014 | Malgorn et al. | |
| 2015/0013292 A1 | 1/2015 | Coulonvaux et al. | |
| 2015/0151226 A1 | 6/2015 | Ries et al. | |
| 2016/0023133 A1 * | 1/2016 | Sasur | B01D 27/005 156/60 |
| 2017/0030384 A1 | 2/2017 | Pastori | |
| 2017/0274301 A1 | 9/2017 | Malgorn et al. | |

FOREIGN PATENT DOCUMENTS

| | | |
|---|---|---|
| FR | 2779661 A1 | 12/1999 |
| WO | 2002081052 A1 | 10/2002 |
| WO | 2006078587 A2 | 7/2006 |
| WO | 2015050540 A1 | 4/2015 |
| WO | 2017050370 A1 | 3/2017 |
| WO | WO-2018075058 A1 * | 4/2018 ............ B01D 29/21 |

OTHER PUBLICATIONS

Machine assisted English translation of FR2779661A1 obtained from https://patents.google.com/patent on Apr. 2, 2020, 5 pages.

\* cited by examiner

US 11,465,083 B2

SERVICEABLE OIL FILTER ASSEMBLY

CROSS-REFERENCE TO RELATED APPLICATIONS

This application is the National Stage of International Application No. PCT/US2018/038972 filed on Jun. 22, 2018, which claims the benefit of U.S. Provisional Application 62/523,909, filed Jun. 23, 2017, the disclosures of which are hereby incorporated by reference.

TECHNICAL FIELD

The present invention relates generally toward a serviceable oil filter assembly for use with an internal combustion engine.

BACKGROUND

Oil filtration is an important function for complex mechanical devices that make use of circulating oil for lubricity, for example, internal combustion engines. While performing the necessary function of lubricating complex mechanical devices, circulating oil is known to become contaminated with environmental dirt and with metal fines trapped within the circulating oil and resulting from wear upon mechanical components. As contaminants build up in the oil circulating throughout a mechanical device, mechanical failures can occur through loss of lubricity. Therefore, it is required that the contaminants be removed from the oil by filtration.

Various filtration assemblies are engineered for oil circulation systems to filter contaminants from the oil. An internal filtration media is generally retained within a filtration housing into which dirty oil is pumped, and filtered oil is evacuated. Over time, the filtration media can become fouled, preventing a necessary flow rate of oil from occurring within the oil circulation system. As such, the filtration assemblies requires provisions for removing and replacing the filtration media (e.g., servicing of the filtration assemblies). These filtration assemblies are known to be complex, requiring extended service time to disassemble, replace, and reinstall the filtration media. Therefore, it would be advantageous to develop a simplified filtration assembly that would simplify the process for servicing the filtration assembly.

SUMMARY

An improved serviceable oil filter assembly is provided. The oil filter assembly includes a first end cap, a second end cap, a retainer element, and a cylindrical filter element. The first end cap defines a dirty oil inlet and a clean oil outlet. The second end cap includes a threaded collar for attachment to a threaded sidewall of the first endcap. The retainer element secures the cylindrical filter element within an interior volume of the oil filter assembly. The cylindrical filter element functions in combination with the retainer element to divide the interior volume of the serviceable oil filter assembly into a dirty oil chamber in fluid communication with the dirty oil inlet and a clean oil chamber in fluid communication with the clean oil outlet.

In one embodiment, the cylindrical filter element is received within an annular channel defined by first and second concentric flanges of the second end cap. The retainer element includes a stem portion and a cap portion. The stem portion extends through a core of the cylindrical filter element in abutment with the second end cap. The cap portion extends over the cylindrical filter element. The oil filter assembly of the present invention simplifies the service requirements for replacing the filter element. The filter element, the second end cap, and the retainer element may now be removed and replaced by hand tools. A service technician need no longer disassemble the entire oil filter assembly in order to replace the filter element.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
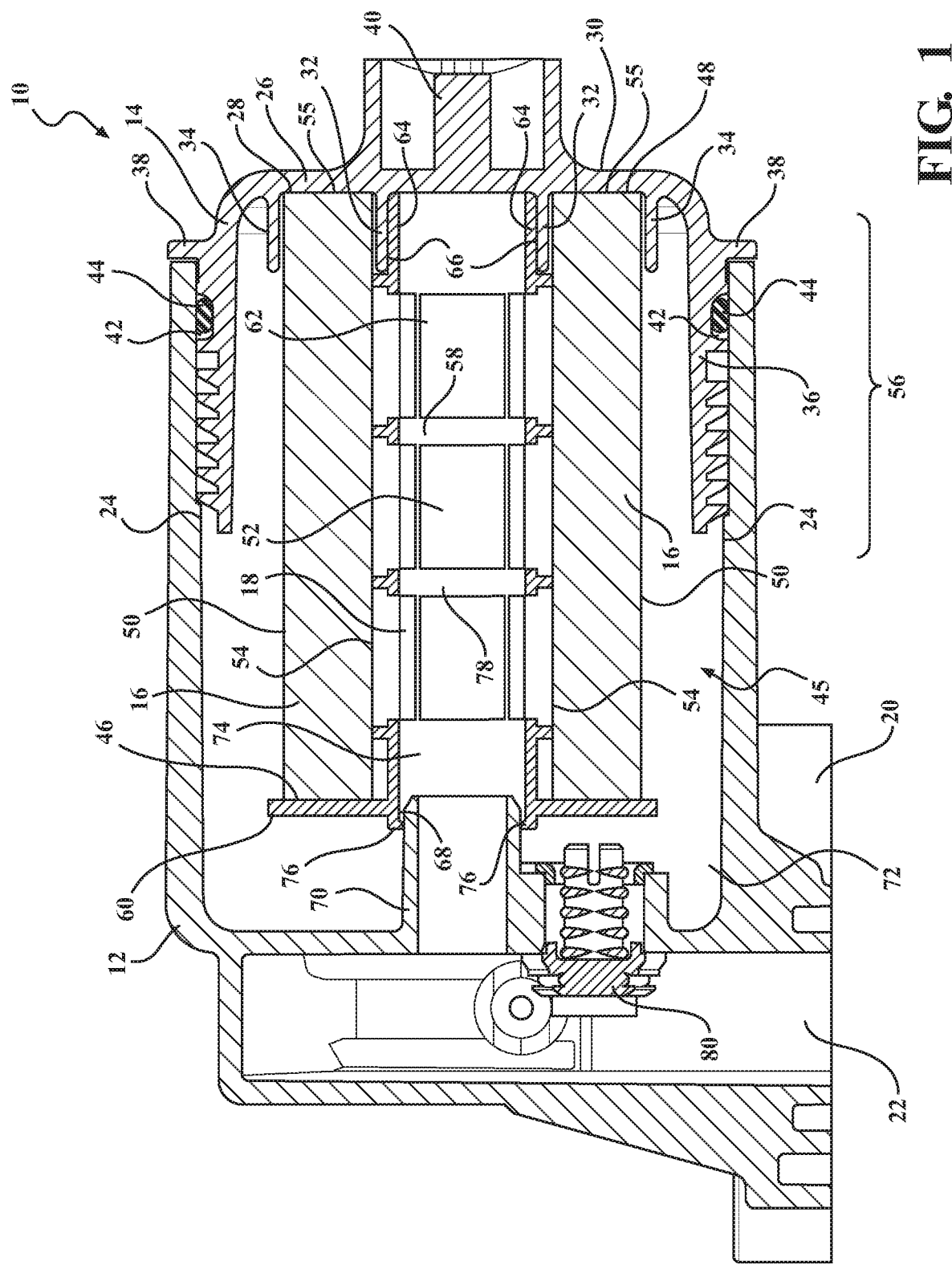
FIG. 1 shows a side cross-sectional view of the serviceable oil filter assembly in accordance with one embodiment of the present invention.
Figure 2A:
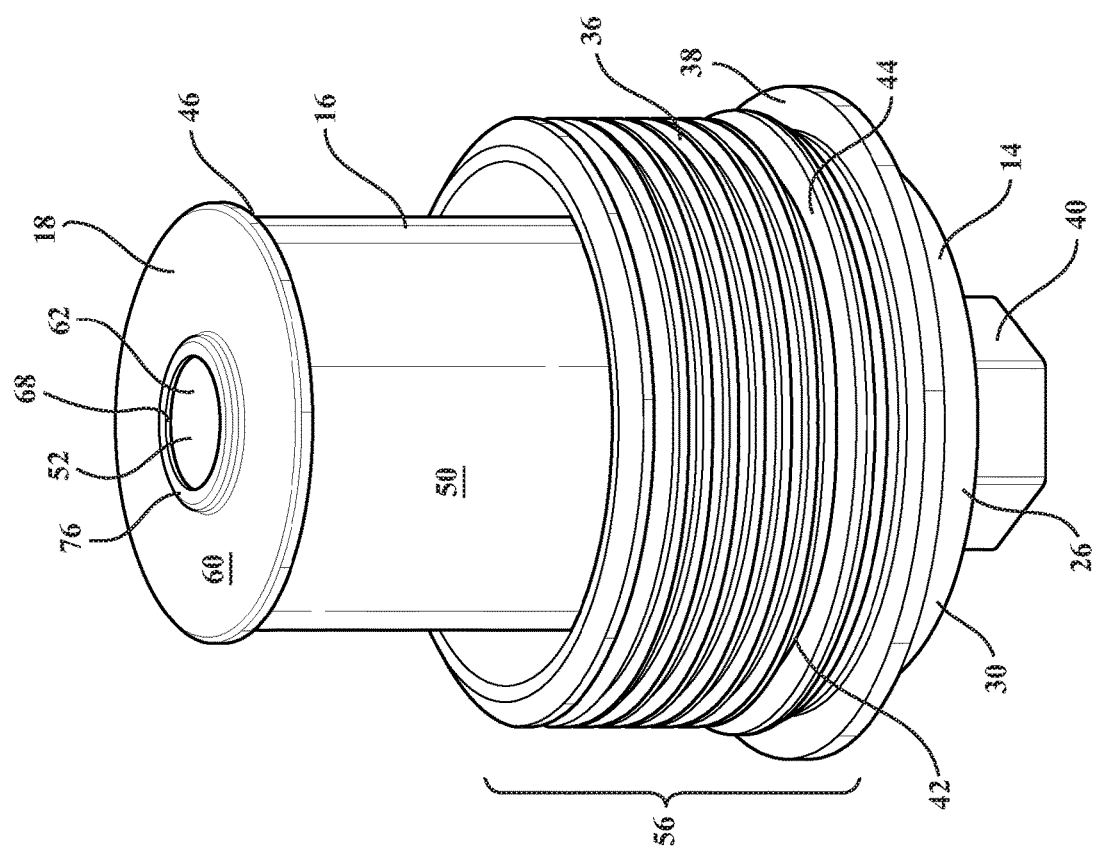
FIGS. 2A and 2B show perspective views of a second end cap portion of the oil filter assembly of FIG. 1.
Figure 2B:
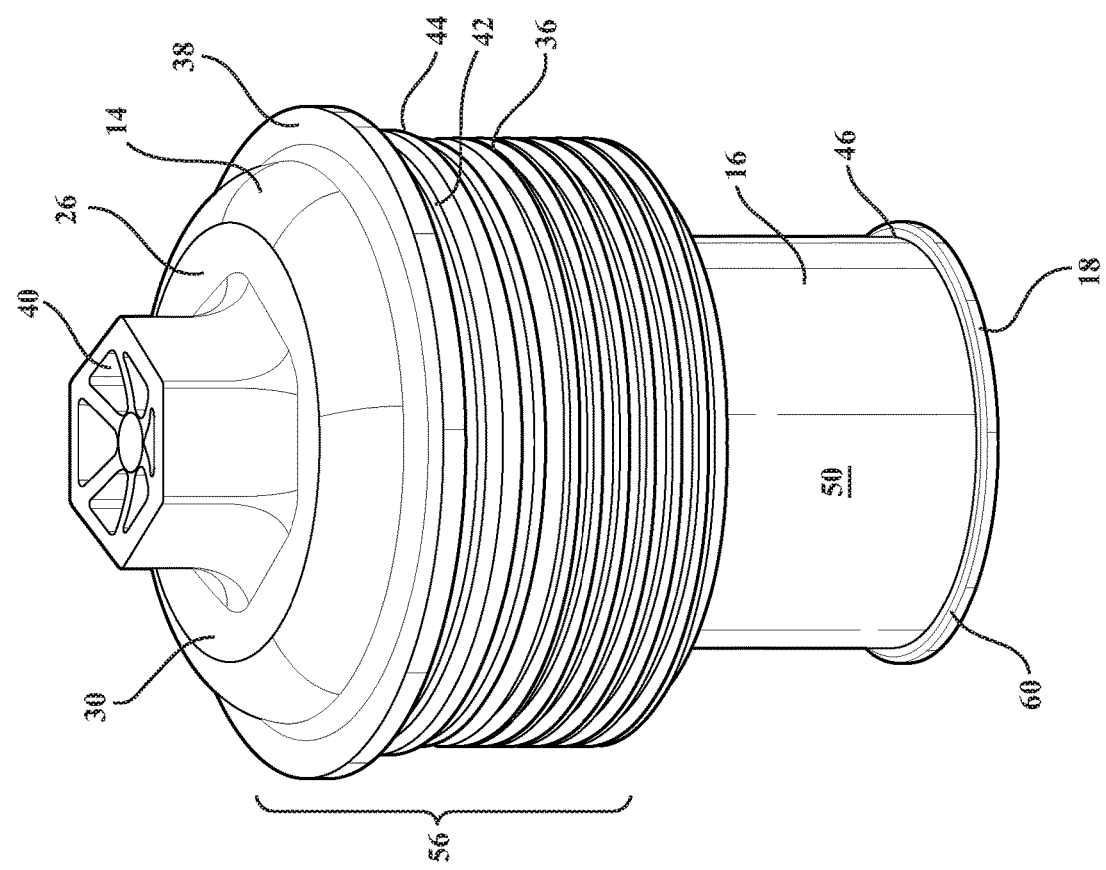
Figure 4:
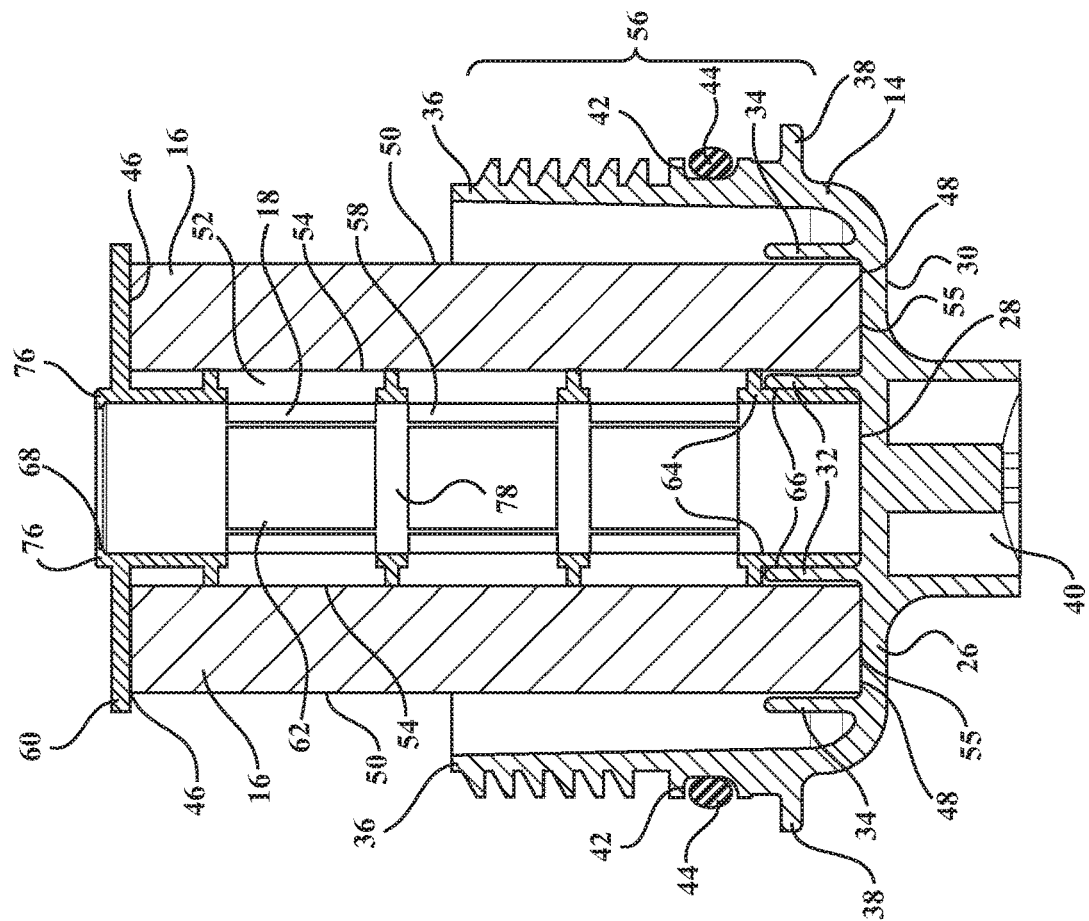
FIG. 4 is a side sectional view of a second end cap portion of the oil filter assembly of FIG. 1.
Figure 3:
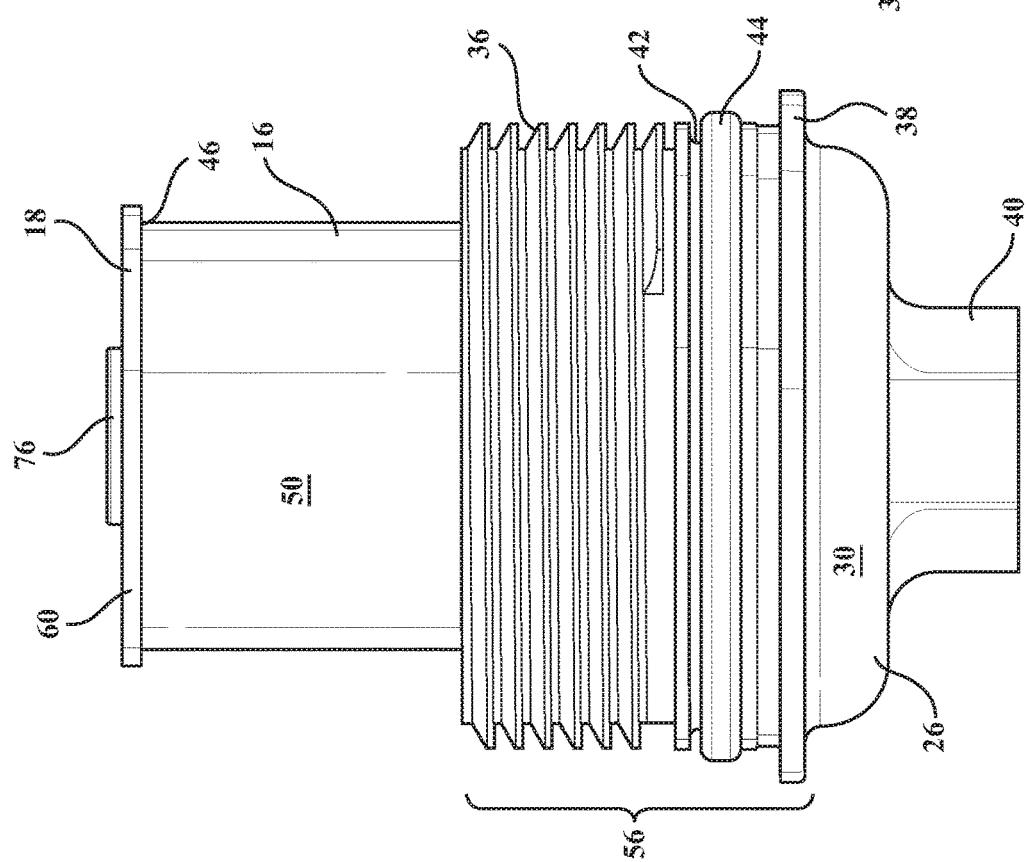
FIG. 3 is a side view of a second end cap portion of the oil filter assembly of FIG. 1.

Referring to FIGS. 1-5, a serviceable oil filter assembly in accordance with one embodiment is illustrated and generally designated 10. The serviceable oil filter assembly 10 includes a first end cap 12, a second end cap 14, a cylindrical filter element 16, and a retainer element 18. The cylindrical filter element 16 functions in combination with the retainer element 18 to separate the oil filter assembly 10 into a dirty oil chamber and a clean oil chamber. Each such feature of the oil filter assembly 10 is discussed below.

Referring to FIG. 1, the first end cap 12 defines a dirty oil inlet 20 and a clean oil outlet 22. The dirty oil inlet 20 and clean oil outlet 22 are in fluid communication with an oil circulation system of a vehicle engine. The dirty oil inlet 20 presents oil to the serviceable oil filter assembly 10 that has circulated through an oil circulation system of a vehicle engine so that it may be filtered. Oil that has passed through the serviceable oil filter assembly 10 is reintroduced via a clean oil outlet 22 to the oil circulation system of the vehicle engine. As described further below, oil passes through the cylindrical filter element 16 in order to flow from the dirty oil inlet 20 to the clean oil outlet 22. Therefore, under normal operating conditions, only filtered oil exits through the clean oil outlet 22. The first end cap 12 includes a cylindrical extension having a threaded sidewall 24. It is to be noted that only the internal surface, i.e. threaded sidewall 24, of the first end cap 12 is threaded.

The second end cap 14 includes an endwall 26 having an inner surface 28 and an outer surface 30. The endwall 26 optionally defines a dome shape, further optionally a generally planar shape, optionally a generally planar shape with curved side-edges. Generally, the endwall 26 has a uniform thickness, although the uniformity of the endwall 26 thickness is not limiting. A first concentric flange 32 and a second concentric flange 34 protrude from the inner surface 28 of the endwall 26. The first concentric flange 32 has a diameter that is less than the second concentric flange 34 such that the first concentric flange 32 is disposed concentrically within the second concentric flange 34. Extending from and integrally attached to the inner surface 28 of the endwall 26 is a threaded collar 36 for attachment to the threaded sidewall 24 of the first end cap 12. It is to be understood, therefore, that the threaded collar 36 is so configured as to be capable of being threadably engaged by the threaded sidewall 24 of the first end cap 12; therefore, the threaded collar 36 is threaded on an external surface thereof so as to engage the threaded sidewall 24 of the first end cap 12.

The second end cap 14 further includes a radial flange 38 extending radially from the second end cap 14 proximal to a termination of threading on the threaded collar 36. The radial flange 38 is so configured as to prohibit threadably over-engaging the threaded collar 36 with the threaded sidewall 24 of the first end cap 12 by obstructively impacting a terminal portion of the threaded sidewall 24 when the threaded collar 36 is fully threadably engaged (i.e. engaged to a predetermined extent) with the threaded sidewall 24. The radial flange 38 can further function to assist in providing an opposing force to ensure a tight engagement between the threaded collar 36 and the threaded sidewall 24.

The second end cap 14 includes a polygonal protrusion 40 extending from the outer surface 30. The polygonal protrusion 40 is coaxial with the threaded collar 36. The cross-sectional shape of the polygonal protrusion 40 is not limiting, optionally square, further optionally hexagonal. The polygonal protrusion 40 is so configured as to be engaged by a wrench to assist in rotating the second end cap 14 to threadably engage or disengage the threaded collar 36 with the threaded sidewall 24, as described further below. In other embodiments the protrusion 40 is instead a recess, for example a hexagonal recess for a hex key.

The externally threaded collar 36 includes a groove 42 for receiving an annular seal 44, optionally an elastomeric O-ring seal 44. The annular seal 44 helps to establish a fluid-tight seal when the threaded collar 36 is threadably engaged with the threaded sidewall 24 of the first end cap 12 by establishing a fluid-tight seal between the externally threaded collar 36 and the threaded sidewall 24 of the first end cap 12. The annular seal 44, therefore, functions to supplement the seal established when the threaded sidewall 24 of the first end cap 12 is threadably engaged by the threaded collar 36. Together, the first end cap 12 and the second end cap 14 when threadably engaged with one another to establish a fluid-tight seal constitute an oil filter housing defining an interior volume 45.

The cylindrical filter element 16 includes a first end 48 opposite a second end 46. The material construction and configuration of the cylindrical filter element 16 is non-limiting and can be selected from any of a variety of material constructions and configurations known in the art to be effective for achieving the intended purpose of the serviceable oil filter assembly 10. The cylindrical filter element includes an outer surface 50 and a core 52 defining an inner wall 54. The cylindrical filter element 16 is received within an annular channel 55 defined by the first concentric flange 32 and the second concentric flange 34 such that the first end 48 of the filter impacts the inner surface 28 of the endwall 26 of the second end cap 14, the first concentric flange 32 is disposed adjacent to the inner wall 54 of the core 52 of the cylindrical filter element 16, and the second concentric flange 34 is disposed adjacent to the outer surface 50 of the cylindrical filter element 16. Thus, the cylindrical filter element 16 is disposed concentrically outwardly of the first concentric flange 32 and concentrically inwardly of the second concentric flange 34.

The second end cap 14 extends over a first end portion 56 of the cylindrical filter element 16. In particular, the threaded collar 36 extends over a first end portion 56 of the cylindrical filter element. The retainer element 18 is intended, in part, to help secure the cylindrical filter element 16 to the second end cap 14 as well as to assist in properly aligning the cylindrical filter element 16 within the second end cap 14. The retainer element 18 includes a stem portion 58 and a cap portion 60. The stem portion 58 extends through the core 52 of the cylindrical filter element 16 in abutment with the second end cap 14. The retainer element 18 defines an interior channel 62, which forms part of an internal volume defined by the core 52 of the filter, for directing clean oil to the clean oil outlet 22. The stem portion 58 includes, at a portion distal to the cap portion 60, an alignment member 64. The alignment member 64 is received by the first concentric flange 32, and the alignment member 64 has a shape and configuration complimentary to those of the first concentric flange 32. By means of the interaction between the first concentric flange 32 and the alignment member 64, the retainer element 18 is properly aligned with the second end cap 14 and, thus, is properly aligned within the serviceable oil filter assembly 10. Thus, the retainer element 18, functions in part to properly align the cylindrical filter element 16 with the second end cap 14 and, in turn, within the serviceable oil filter assembly 10.

Optionally, the alignment member 64 threadably engages a threaded inward-facing surface 66 of the first concentric flange 32. Further optionally, the alignment member 64 engages with an interference fit with the first concentric flange 32. Optionally, the alignment member 64 is secured to the first concentric flange 32 by means of an adhesive or through welding. Further optionally, since the cylindrical filter element 16 may be aligned with the second end cap 14 by means of the first concentric flange 32 and the second concentric flange 34, and the core 52 may not require support provided by the stem portion 62 of the retainer element 18, as described below, the retainer element 18 excludes the stem portion 58 and the alignment member 64.

The cap portion 60 of the retainer element 18 is generally disc-shaped and abuts and covers the second end 46 of the cylindrical filter element 16 in a fluid-tight manner. The cap portion 60 includes a central opening 68 partly forming the interior channel 62. The central opening 68 of the cap portion 60 establishes a fluid-tight seal with a nozzle 70 extending from a surface of the first end cap 12 to allow fluid communication between an inner volume defined by the nozzle 70 and the interior channel 62, and, therefore the core of the cylindrical filter element 16. The interior volume defined by the nozzle 70 is in fluid communication with and continuous with the clean oil outlet 22 of the serviceable oil filter assembly 10. The retainer element 18, therefore, functions in combination with the second end cap 14 and the cylindrical filter element 16 to divide the interior volume 45 of the serviceable oil filter assembly 10 into a dirty oil chamber 72 and a clean oil chamber 74 such that any fluid passing from one chamber to the other passes through the cylindrical filter element 16. The central opening 68 of the cap portion 60 can include a sealing flange 76 extending axially from the cap portion 60 adjacent to the perimeter of the central opening 68 on a side of the cap portion 60 opposite that side in contact with the cylindrical filter element 16 and configured so as to assist in the establishment of a fluid-tight seal between the nozzle 70 and the cap portion 60. Alternatively, a grommet or other seal may be included to further assure dirty oil disposed in the dirty oil chamber 72 cannot pass into the clean oil chamber 74.

Therefore, the retainer element 18 has the additional function of assisting in the establishment of a clean oil chamber 74 and a dirty oil chamber 72 within the serviceable oil filter assembly 10.

Figure 5:
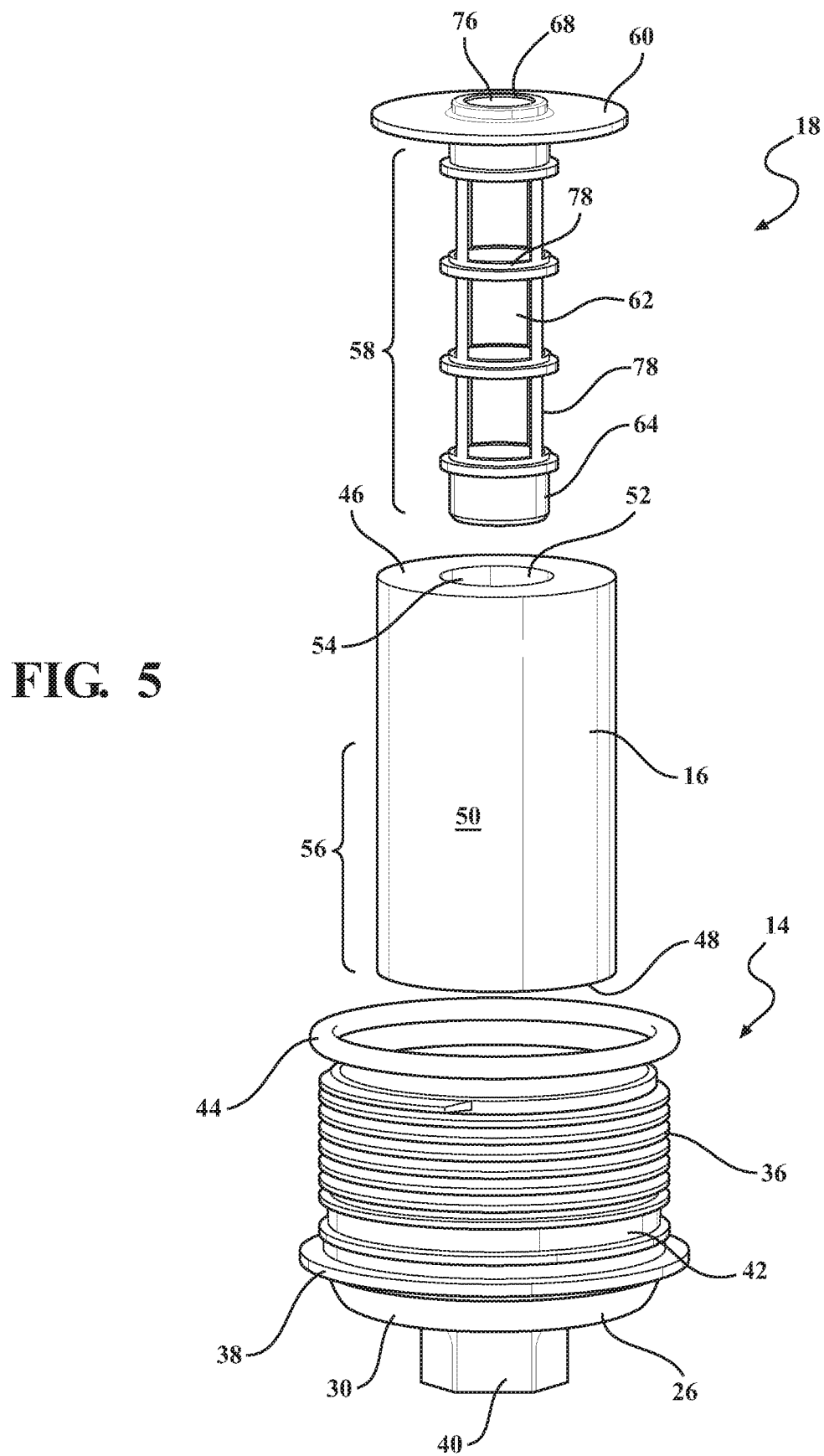
FIG. 5 is an exploded view of a second end cap portion of the oil filter assembly of FIG. 1.

The stem portion 58 of the retainer element 18 may be so configured as to provide structural support to the inner wall 54 of the core 52 of the cylindrical filter element 16. Optionally, the stem portion 58 of the retainer element 18 may be configured to form a cage 78 providing structural support to the inner wall 54 of the core 52 of the cylindrical filter element 16. The cage 78 may have a variety of configurations, which, as a non-limiting example, may include a series of axially extending parallel bars disposed evenly around the perimeter of a cylinder and interconnected to one another for structural reinforcement and rigidity at various axial positions by rings, as shown in FIG. 5.

Optionally, the cylindrical filter element 16 is secured both to the second end cap 14 and to the cap portion 60 of the retainer element 18 in a fluid-tight manner by an adhesive. Optionally, the second end cap 14 and the retainer element 18 are manufactured of a polymeric material, optionally a thermoplastic, and the cylindrical filter element 16 is secured to the second end cap 14 and to the retainer element 18 by being molded into the second end cap 14 and the retainer element 18.

The serviceable oil filter assembly 10 may include a bypass valve 80 to allow dirty oil to bypass the cylindrical filter element 10 when a pressure differential across the cylindrical filter element 10 exceeds a pre-set value. For example, when fluid-flow through the cylindrical filter element 10 becomes obstructed for any reason, damage to components of the oil circulation system of a vehicle engine or catastrophic failure of the serviceable oil filter assembly may be avoided by enabling oil to nevertheless continue to flow unobstructed by bypassing the cylindrical filter element 10 that would otherwise block fluid flow. The bypass valve 80 is so disposed as to facilitate, under appropriate pressure conditions, fluid flow directly between the dirty oil chamber 72 and the clean oil outlet 22.

Various elements of the serviceable oil filter assembly 10 may be reused or replaced during servicing in different combinations. Generally, the first end cap 12 is reusable. The second end cap 14 and the retainer element 18 may be reused or disposed of in various combinations during servicing. For example, the serviceable oil filter assembly 10 may be so configured as to enable the retainer element 18 and the second end cap 14 to be reused during servicing of the serviceable oil filter assembly 10 to replace the cylindrical filter element 16 with a second cylindrical filter element 16 where the second cylindrical filter element 16 is previously unused. Alternatively, the second end cap 14, the retainer element 18, and the cylindrical filter element 16 may be disposed of together during servicing of the serviceable oil filter assembly 10 and replaced with corresponding new components. Still further alternatively, the retainer element 18 may be disposed of with the cylindrical filter element 16 during servicing of the serviceable oil filter assembly 10 and replaced with corresponding new components whereas the second end cap 14 is reused.

A method of servicing a serviceable oil filter assembly 10 includes the following actions. Providing the serviceable oil filter assembly 10. Threadably removing the second end cap 14 from the first end cap 12 by rotatably engaging the polygonal protrusion 40 with a tool and rotating the second end cap 14 until it becomes threadably disengaged from the threaded sidewall 24 of the second end cap 14. Withdrawing the second end cap 14 along with the cylindrical filter element 16 and retainer element 18 from the first end cap 12. Providing a replacement second end cap 14 portion of the serviceable oil filter assembly 10 including a replacement second end cap 14, a replacement cylindrical filter element 16, and a replacement retainer element 18. Inserting the replacement second end cap 14 portion of the serviceable oil filter assembly 10 into the first end cap 12. Threadably engaging the replacement second end cap 14 to the first end cap 12 by rotabably engaging the polygonal protrusion 40 with a tool and rotating the second end cap 14 until it becomes fully threadably engaged with the threaded sidewall 24 of the second end cap 14 and, optionally, the radial flange 38 contacts the threaded sidewall 24 of the first end cap 12, and the annular seal 44 establishes a fluid-tight seal between the threaded sidewall 24 of the first end cap 12 and the threaded collar 36 of the second end cap 14. Optionally, the method includes the action of reusing the second end cap 14 as the replacement second end cap 14, and reusing the retainer element 18 as the replacement retainer element 18. Optionally, the method includes the actions of disposing of the cylindrical filter element 16 and using a previously unused cylindrical filter element 16 as the replacement cylindrical filter element 16. Optionally, the method includes the actions of discarding the second end cap 14, discarding the retainer element 18, and discarding the cylindrical filter element 16. Optionally, the method includes the action of reusing the second end cap 14 as the replacement second end cap 14.

The various elements of the components of the embodiments of the serviceable oil filter assembly described above, e.g. the first end cap 12, the second end cap 14, the cylindrical filter element 16, and the retainer element 18, may be manufactured of the same or different material(s), such as any one or more of the materials described below. Typically, the first end cap 12, the second end cap 14, and the cylindrical filter element 16 are each monolithic in construction and homogeneous in composition. However, each element of the serviceable oil filter assembly may comprise multiple components joined together. Moreover, each component may itself comprise a combination of different materials, and thus may not comprise a homogeneous composition throughout. In general, materials suitable for use in or as the serviceable oil filter assembly 10 (e.g. the first end cap 12, the second end cap 14, the cylindrical filter element 16, and the retainer element 18) include metals (e.g. steels, aluminums, alloys, etc.), resins (e.g. thermoset and/or thermoplastic resins), and combinations thereof.

As used above, the term "fluid-tight" implies generally restrictive or prohibitive of fluid flow. However, "fluid-tight" does not exclude the possibility of some minimal fluid flow across a seal in some instances. "Fluid-tight" implies a lack of fluid flow across an interface, however, there are instances where "fluid-tight" may refer to some instances wherein fluid may still leak or minimally flow across an interface, although such leakage or flowing may be undesirable and non-ideal.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, terms such as "orthogonal", "horizontal," and "vertical" are not to be interpreted in an absolute sense subject to the rigorous demands of geometric precision but, rather, as general indicators of a configurational arrangement between two or more elements. For example, the word "orthogonal" as used herein is not exclusive of the possibility wherein two surfaces being "orthogonal" to one another form an angle having a value other than 90 degrees at a point of intersection.

The invention claimed is:

1. A serviceable oil filter assembly comprising:
   a first end cap defining a dirty oil inlet and a clean oil outlet, the first end cap including a threaded sidewall;
   a second end cap including an endwall defining an annular channel and including a threaded collar for attachment to the threaded sidewall of the first end cap, the second end cap further including a first concentric flange and a second concentric flange extending from an inner surface of the endwall, the first concentric flange having a diameter that is less than the second concentric flange, the annular channel being defined by the first concentric flange and the second concentric flange;
   a cylindrical filter element including a first end opposite a second end, the first end of the cylindrical filter element being received within the annular channel of the second end cap; and
   a retainer element including a stem portion and a cap portion, the stem portion extending through a core of the cylindrical filter element in contact with the second end cap, the cap portion of the retainer element abutting the second end of the cylindrical filter element.

2. The serviceable oil filter assembly of claim 1 wherein the retainer element defines an interior channel for directing clean oil to the clean oil outlet.

3. The serviceable oil filter assembly of claim 1 wherein the threaded collar includes a groove for receiving an annular seal.

4. The serviceable oil filter assembly of claim 1 wherein the second end cap includes a radial flange to obstructively impact the threaded sidewall of the first end cap when the threaded collar is threadably engaged with the threaded sidewall.

5. The serviceable oil filter assembly of claim 1 wherein the cylindrical filter element is secured to the second end cap and to the cap portion of the retainer element by adhesive.

6. The serviceable oil filter assembly of claim 1 wherein the second end cap and the retainer element are manufactured of a polymeric material.

7. The serviceable oil filter assembly of claim 1 further including a bypass valve to permit dirty oil to bypass the cylindrical filter element.

8. The serviceable oil filter assembly of claim 1 wherein the retainer element establishes a fluid-tight seal with a nozzle extending from a surface of the first end cap.

9. The serviceable oil filter assembly of claim 8 wherein the cap portion includes a sealing flange to provide a fluid-tight seal with the nozzle.

10. The serviceable oil filter assembly of claim 1 wherein the stem portion includes a cage configured to provide structural support to a wall of the core of the cylindrical filter element.

11. The serviceable oil filter assembly of claim 1 wherein the second end cap is reusable and the retainer element and the cylindrical filter element are disposable and replaceable.

12. The serviceable oil filter assembly of claim 1 wherein the second end cap and the retainer element are reusable and the cylindrical filter element is replaceable.

13. A serviceable oil filter assembly comprising:
   a cylindrical filter element including a first end opposite a second end; and
   an oil filter housing for removably receiving the cylindrical filter element therein, the oil filter housing including a first end cap threadably engaged to a second end cap, wherein the first end cap includes a dirty oil inlet and a clean oil outlet, and wherein the second end cap includes an endwall defining an annular channel and includes a threaded collar, the first end of the cylindrical filter element being received within the annular channel of the second end cap, the second end cap further including a first concentric flange and a second concentric flange extending from an inner surface of the endwall, the first concentric flange having a diameter that is less than the second concentric flange, the annular channel being defined by the first concentric flange and the second concentric flange; and
   a retainer element to secure the cylindrical filter element within an interior volume of the oil filter housing, the retainer element including a hollow stem portion and a cap portion, the hollow stem portion extending through a core of the cylindrical filter element in abutment with the endwall, the cap portion abutting the second end of the cylindrical filter element,
   wherein the cylindrical filter element is accessible for replacement by threadably removing the second end cap from the first end cap, and wherein the cylindrical filter element functions in combination with the retainer element to divide an interior volume of the oil filter housing into a dirty oil chamber in fluid communication with the dirty oil inlet and a clean oil chamber in fluid communication with the clean oil outlet.

14. The serviceable oil filter assembly of claim 13 further including a bypass valve to permit dirty oil to bypass the cylindrical filter element.

15. The serviceable oil filter assembly of claim 13 wherein the threaded collar includes a groove for receiving an annular seal.

* * * * *